United States Patent
Godfrey et al.

(10) Patent No.: US 10,185,371 B1
(45) Date of Patent: Jan. 22, 2019

(54) ORIENTABLE COMPUTING DEVICE

(71) Applicant: Lenovo (Singapore) Pte. Ltd., Singapore (SG)

(72) Inventors: Cyan Godfrey, Chapel Hill, NC (US); Joel Collins, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/655,737

(22) Filed: Jul. 20, 2017

(51) Int. Cl.
*G06F 1/18* (2006.01)

(52) U.S. Cl.
CPC .............. *G06F 1/182* (2013.01); *G06F 1/184* (2013.01); *G06F 1/187* (2013.01); *G06F 1/188* (2013.01)

(58) Field of Classification Search
None
See application file for complete search history.

(56) References Cited

U.S. PATENT DOCUMENTS

| | | | | |
|---|---|---|---|---|
| 6,419,198 B1* | 7/2002 | Einav | ................... | A47B 91/005 248/346.03 |
| 7,392,968 B2* | 7/2008 | Ke | ........................ | F16M 11/22 248/346.01 |
| 7,448,587 B2* | 11/2008 | Han | ...................... | A47B 91/00 211/41.6 |
| 7,527,228 B2* | 5/2009 | Chung | ................. | F16M 11/041 248/154 |
| 2004/0136167 A1* | 7/2004 | Sullivan | ............... | G06F 1/1601 361/728 |
| 2006/0000958 A1* | 1/2006 | Li | ......................... | F16M 11/18 248/188.3 |
| 2006/0082265 A1* | 4/2006 | Quijano | ................. | G06F 1/181 312/223.2 |
| 2006/0193615 A1* | 8/2006 | Funahashi | ............. | G03B 17/08 396/29 |
| 2008/0159712 A1* | 7/2008 | Hayashi | .............. | H04N 5/2251 386/358 |
| 2009/0009953 A1* | 1/2009 | Lin | ....................... | G06F 1/1632 361/679.33 |
| 2009/0279245 A1* | 11/2009 | Le | ........................ | G06F 1/181 361/679.33 |
| 2010/0188812 A1* | 7/2010 | Morrison | ............ | F16M 11/041 361/679.58 |
| 2013/0234572 A1* | 9/2013 | Hsu | ........................ | G06F 1/181 312/223.2 |
| 2014/0000136 A1* | 1/2014 | Wu | ........................ | G06F 1/181 40/606.15 |
| 2016/0313761 A1* | 10/2016 | Wu | .......................... | G06F 1/16 |
| 2018/0006418 A1* | 1/2018 | Jung | ................... | H01R 31/065 |

* cited by examiner

Primary Examiner — Xanthia C Cunningham
(74) Attorney, Agent, or Firm — Brian J. Pangrle

(57) ABSTRACT

A computing device can include a chassis; a circuit board coupled to the chassis; a processor operatively coupled to the circuit board; and memory accessible by the processor; where the chassis includes a first end, an opposing second end, a first side that includes feet, and an opposing second side that includes feet, and where at least one of the first end and the second end includes an electrical component that is positioned closer to one of the first side and the second side.

23 Claims, 14 Drawing Sheets

ORIENTABLE COMPUTING DEVICE

TECHNICAL FIELD

Subject matter disclosed herein generally relates to technology for a computing device.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

A computing system can include various components such as a chassis, a processor, memory and one or more storage devices.

SUMMARY

A computing device can include a chassis; a circuit board coupled to the chassis; a processor operatively coupled to the circuit board; and memory accessible by the processor; where the chassis includes a first end, an opposing second end, a first side that includes feet, and an opposing second side that includes feet, and where at least one of the first end and the second end includes an electrical component that is positioned closer to one of the first side and the second side. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
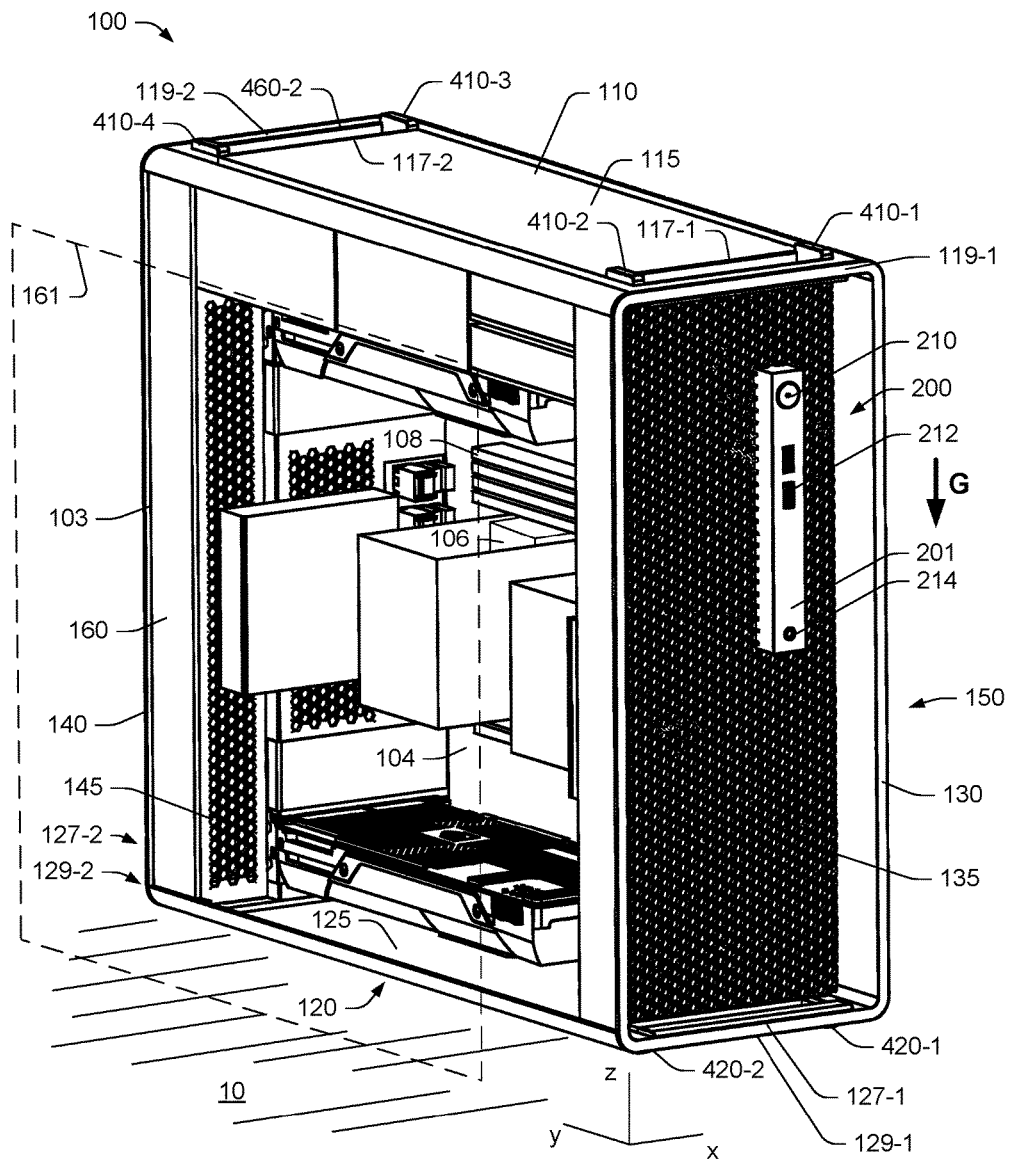
FIG. 1 is a perspective view of an example of a computing device.

FIG. 1 shows an example of a computing device 100 seated on a surface 10. As an example, the computing device 100 may be a workstation, for example, configured to handle information, which may include one or more of processing information, storing information, receiving information and transmitting information.

The computing device 100 can be defined with respect to one or more coordinate systems. For example, FIG. 1 shows a Cartesian coordinate system with x, y and z coordinates, which may be referred to as x, y and z axes or directions. As an example, the coordinate system may be referenced with respect to the surface 10 where the surface 10 defines an x,y-plane at a zero z position. As an example, the computing device 100 may be defined with respect to a coordinate system where a feature or features of the computing device 100 may define one or more zero positions (e.g., (0, 0, 0), etc.).

The computing device 100 can include a chassis 103, a circuit board 104 coupled to the chassis 103; a processor 106 operatively coupled to the circuit board 104; and memory 108 accessible by the processor 106; where the chassis 103 includes a first end 130, an opposing second end 140, a first side 110 that includes feet 410-1, 410-2, 410-3 and 410-4, and an opposing second side 120 that includes feet 420-1, 420-2, 420-3 (not shown) and 420-4 (not shown), and where at least one of the first end 130 and the second end 140 includes at least one electrical component 200 that is positioned closer to one of the first side 110 and the second side 120. For example, the first end 130 is shown as including at least one electrical component 200 that is closer to the first side 110 than the second side 120.

As an example, the at least one electrical component 200 can include a power button 210. As an example, the at least one electrical component 200 can include a connector 212. As an example, the at least one electrical component 200 can include an indicator light 214.

With respect to the coordinate system shown in FIG. 1, the first end 130 is substantially in an x,z-plane and the second end 140 is substantially in an x,z-plane that is disposed a distance in the y direction from the first end 130.

With respect to the coordinate system shown in FIG. 1, the first side 110 is substantially in an x,y-plane and the second side 120 is substantially in an x,y-plane that is disposed a distance in the z direction from the first side 110.

FIG. 1 also shows reference numerals for opposing sides 150 and 160 that are substantially in respective y,z-planes, disposed apart from one another by a distance in the x direction.

In the example of FIG. 1, a dashed line represents a cover 161, which may be a panel that can be fit to the side 160 to thereby define a cavity within the chassis 103. The cover 161 may be made of an opaque or other type of material such that the various components within the cavity of the chassis 103 are not directly visible from the side 160; noting that openings (e.g., in the ends 130 and 140) may allow for visibility of one or more internal components (e.g., circuitry, fans, etc.).

As an example, the cover 161 may be a door that is hinged to the chassis 103. In such an example, the location of the hinge can dictate the open end of the cover 161 that is to swing away from the chassis 103. In such an example, orientation of the computing device 100 with respect to one or more obstructions in an environment can be a concern to a user or someone that is to service the computing device 100 (e.g., as to one or more field replaceable units (FRUs), add-ons, etc.).

As an example, the cover 161 may be transparent or at least in part transparent (e.g., translucent). For example, consider a cover that is formed at least in part from a substantially transparent (e.g., clear, etc.) acrylonitrile butadiene styrene (ABS) material (e.g., or other type of transparent material. Such a cover may allow a user or a servicer to see into the cavity of the chassis 103 when the cover is closed.

As an example, the chassis 103 of the computing device 100 may be defined substantially as a hexahedron as it is a polyhedron with six ends or sides 110, 120, 130, 140, 150 and 160; noting that ends 130 and 140 can include one or more recessed surfaces 135 and 145. In the example of FIG. 1, the recessed surfaces 135 and 145 include openings that can be aesthetic and/or functional in that they can allow for airflow. For example, the computing device 100 can include one or more fans that can drive air through at least a portion of a cavity that is between the first side 110 and the second side 120. As various circuitry can generate heat energy, the circuit board 104, which is oriented substantially in an y,z-plane can be oriented to be substantially aligned with gravity or to be substantially perpendicular with gravity where the processor 106 (e.g., or processors) are, for example, positioned on an upward side such that heat energy may flow via air convection away from the processor 106 (e.g., rather than being "trapped" by the circuit board 104 in a downward side orientation).

As an example, a computing device can include one or more end surfaces that is not recessed. For example, the surface 135 may be even with the front end 130. As an example, the surface 145 may be even with the back end 140. In such examples, one or more openings such as the openings 117-1, 117-2, 127-1 and 127-2 may open to a cavity or cavities of the chassis 103, rather than being exposed as shown in the example of FIG. 1 (e.g., both sides of the openings 117-1 and 127-1 are visible due to the surface 135 being recessed from the front end 130 and due to the openings 117-1 and 127-1 being disposed between a z,x-plane defined by the surface 135 and a z,x-plane defined by the front end 130 (e.g., which may be a rim of the chassis 103, etc.)).

In the example of FIG. 1, the at least one electrical component 200 is shown as being set on a block (e.g., a mount, etc.) that extends away from the recessed surface 135 in a direction toward the front end 130. As an example, the at least one electrical component 200 may be at a different position with reference to a z,x-plane. For example, an electrical component that is visible and accessible via a front end of a computing device may be recessed, even (e.g., flush) and/or protruding with respect to the front end.

As an example, a block that includes one or more electrical components visible and accessible via a front end of a computing device may be oriented with a longest dimension aligned substantially with gravity. In such an example, where natural convection occurs, the block may be less interrupting of natural convection than if the block were in a horizontal orientation. For example, in the example of FIG. 1, a block 201 is shown as having a long axis (e.g., a long dimension in the z-direction) that is substantially oriented with respect to gravity (G) such that convection currents may flow to either side (e.g., left side or right side) of the block 201. If the block 201 were oriented horizontally, it may interrupt convection currents. As an example, a block may be oriented horizontally and may optionally include one or more openings that allow for flow of air, which may be, at least in part, via natural convection. As an example, one or more electrical components and/or one or more other components may be positioned with respect to a computing device in a manner that accounts for flow of air, which may facilitate cooling of one or more components of the computing device.

In the example computing device 100 of FIG. 1, the side 110 includes openings 117-1 and 117-2 that are disposed between a portion 115 of the side 110 and respective portions 119-1 and 119-2 of the side 110. Such openings can be handle openings that form handles for gripping the computing device 100, for example, to lift the computing device 110 upwardly from a surface such as a floor, a table, a desk, a cabinet, etc. For example, consider the surface 10 as being a floor surface, a table surface, a desk surface, a cabinet surface, etc. In such an example, a person may insert fingers of one hand into the opening 117-1 and insert fingers of another hand into the opening 117-2 (e.g., either from above or below) and then lift the computing device 100. In such an example, palm sides of the hands may be, for example, on an opening surface or, for example, on an end surface (e.g., or one each).

In the example of FIG. 1, the computing device 100 is elevated with respect to the surface 10 at least in part by the feet 420-1 and 420-2, which are part of the computing device 100 (e.g., operatively coupled to or integral to the chassis 103). As an example, a foot can be defined at least in part by a z-dimension such that the foot can elevate at least a portion of a computing device. Such a z-dimension may be sufficient to provide for a clearance for air such that an air layer exists between the side 120 of the computing device 100 and the surface 10. Such an air layer may help to reduce conduction of heat energy between the computing device 100 and the surface 10 or vice versa. As an example, such an air layer may help to promote convection of heat energy from the computing device 100.

As shown in the example of FIG. 1, the side 120 can include at least one opening 127-1 and 127-2 (not shown) that is disposed between a portion 125 of the side 120 and respective portions 129-1 and 129-2 (not shown) of the side 120. As mentioned, the feet 420-1 and 420-2 can elevate the side 120 such that air flow may occur between the side 120 and the surface 10. In such an example, air may flow via the opening 127-1, for example, to and/or from openings of the recessed surface 135. As shown, such flow may be substantially in a direction of gravity (G), which can allow for natural convention. Such flow may also be driven via forced convection or one or more other phenomena, mechanisms, etc.

Natural convection is a mechanism, or type of heat transport, in which the fluid motion is not generated by an external source (e.g., like a pump, fan, suction device, etc.) but by density differences in fluid occurring due to temperature gradients. In natural convection, fluid surrounding a heat source receives heat, becomes less dense and rises and, for example, surrounding, cooler fluid can move to replace it. Cooler fluid can then be heated, for example, to form a convection current (e.g., to transfer heat energy from a bottom of a convection cell to a top). The driving force for natural convection is buoyancy, a result of differences in fluid density.

As an example, a method can include operating the computing device 100 as supplied with energy from one or more energy sources (e.g., an electrical outlet, etc.) and generating heat energy via operation of the computing device 100 where the heat energy heats air and makes the air less dense to establish a convection current that draws air in via a lower side of the opening 127-1, which may then flow in and/or around the computing device 100 (e.g., via openings in the recessed surface 135) for assistance with cooling the computing device 100. In such an example, the opening 117-1 may be an air outlet (e.g., a convection chimney outlet) for heated air. As an example, an air current, which may be a convection current (e.g., at least in part a natural convection current) may have a flow path that includes the opening 127-1 and the opening 117-1.

The computing device 100 of FIG. 1 can include connectors, for example, to connect the computing device 100 to one or more peripherals, networks, etc. As an example, the computing device 100 may include wireless circuitry for wireless connection to one or more peripherals, networks, etc.

As an example, the computing device 100 may include one or more bays. For example, a bay may be configured for receipt of a media drive, which may be a standard media drive, for example, a standard drive specified by a SFF specification (e.g., SFF-8000), an ASC specification, an EIA specification, an IEC specification, etc. For example, a "5.25 inch" drive includes four openings on each side of the drive spaced at corners of a rectangle with a length of 3.12 in (79.24 mm) and a width of 0.47 in (11.9 mm) where the rectangle is offset towards the lower and front edges of the sides of the drive. In a SFF specification, such a drive has a length of about 8 in (204.7 mm), a height of about 3.25 in (82.55 mm) and a width of about 5.75 in (146.05 mm). As an example, a media drive may be a DVD drive, a CD drive, etc.

As an example, a media drive that can accept a removable medium (e.g., optical media, etc.) may have a side, such as a side of a translatable tray, that receives the removable medium.

Figure 2:
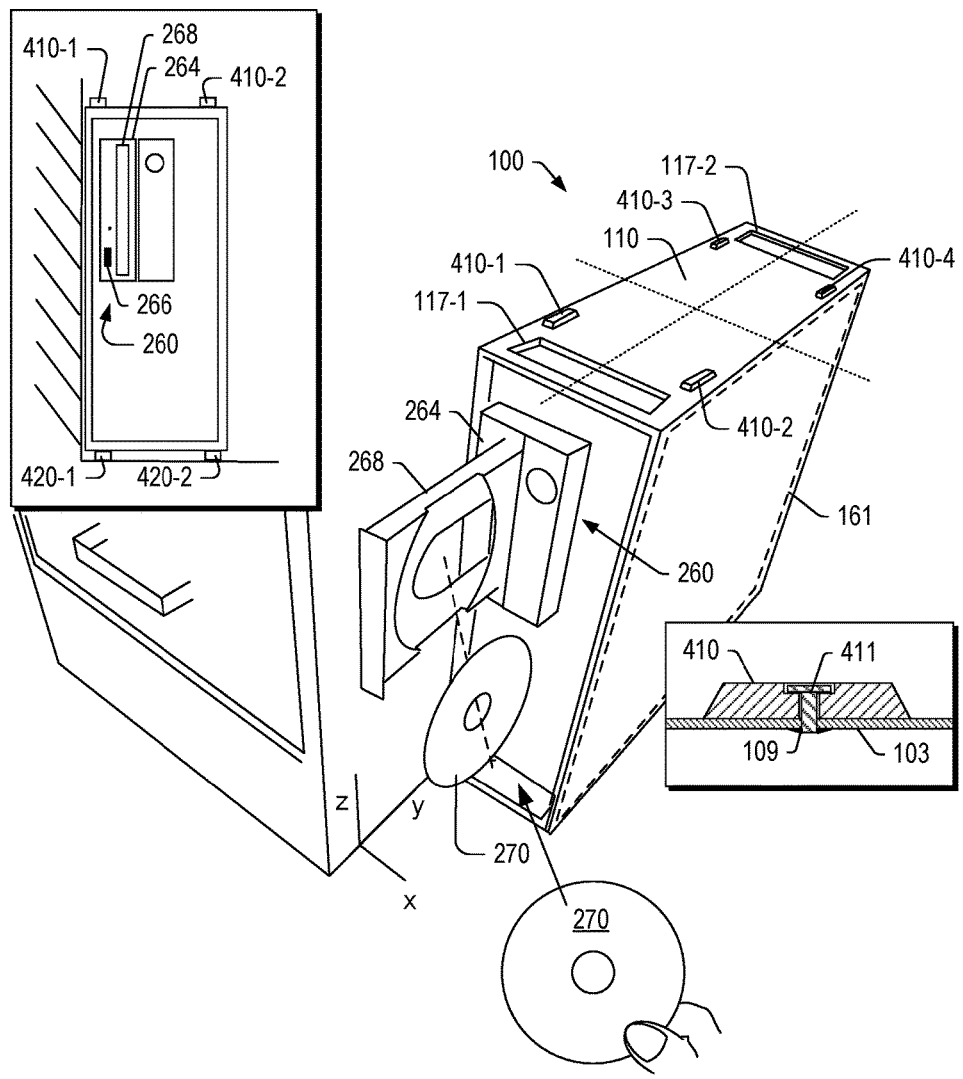
FIG. 2 is a series of diagrams of an example of the computing device of FIG. 1 and an example of a foot.

FIG. 2 shows an example scenario where the computing device 100 includes a media drive 260. As shown in FIG. 2, the computing device 100 can include a removable cover or a hinged cover 161, which may be removable, swingable, etc. to access an interior of the computing device 100.

As shown in the example of FIG. 2, one or more of the feet 410-1, 410-2, 410-3 and 410-4 may be displaced a distance from proximate openings 117-1 and 117-2, which can form handles for the computing device 100. As an example, one or more feet may be attached to a computing device and/or be integral to a chassis of a computing device that has feet on opposing sides (e.g., the side 110 and the side 120 as shown in the example of FIG. 1).

In the example of FIG. 2, approximate midlines are illustrated with respect to the side 110 of the computing device 100, which can define portions of the side 110, which may be halves and quadrants of the side 110. For example, halves may include a front half, a back half, a left half and a right half and, for example, quadrants may include a left front quadrant, a right front quadrant, a left rear quadrant and a right rear quadrant. In the example of FIG. 2, each of the quadrants includes a foot and each half includes two feet. As an example, a half may include a single foot. For example, consider a foot that is a pad that is approximately centered on the midline that extends from the front end to the back end (see, e.g., FIG. 13) or, for example, consider a foot that spans a width between a left side and a right side (see, e.g., FIG. 12). As an example, a foot can be a foot such as the example foot 410 shown in a cross-sectional view inset in FIG. 2 where the foot 410 includes an opening that can receive an attachment component 411 (e.g., a bolt, a screw, etc.) and where the chassis 103 can include a receptacle 109 that connects with the attachment component 411. As an example, a foot may be attached to a chassis via an adhesive. As an example, a foot can include an integral attachment portion, which may be, for example, an extension of the foot (e.g., a shaft, a prong, a portion of a grip, etc.). As an example, a computing device can include feet on opposing sides where each of the opposing sides includes at least two feet where at least one foot is in a front half and where at least one foot is in a back half.

As an example, a midline can extend between a left side and a right side (e.g., in an x-direction). In such an example, a side can include one or more feet positioned between the midline and a front end of the side and can include one or more feet positioned between the midline and a back end of the side. In such an example, one or more feet can be positioned closer to the front end than the midline and one or more feet can be positioned closer to the back end than the midline. As mentioned, another midline may be drawn that runs from front end to back end (e.g., in a y-direction) where a foot may be positioned on that midline (e.g., for a single foot as in a tripod arrangement, etc.) and/or, for example, where at least one foot is positioned between that midline and a left side and where at least one foot is positioned between that midline and a right side.

In the example of FIG. 2, various arrangements can present some access issues that may dictate where the computing device 100 is placed with respect to a wall, a cabinet, a desk or some other obstruction. For example, users frequently find themselves forced to locate a computer tower system up against a cabinet or a wall or some other obstruction. At times, they may need to locate it on a side which gives them very little access to a drive seated in a drive bay. Consider a 5.25 inch media drive with a tray for receipt of removable media (e.g., a disk) where, due to the nature of a chassis design, the 5.25 inch media drive is positioned very close to one side such that there may be insufficient clearance for a user to access the 5.25 inch media drive tray.

Where a media drive includes a slot for receipt of media, the computing device 100 may allow a user to orient the computing device 100 in a manner that can allow for an increased distance between the slot and an obstruction (e.g., wall, cabinet, desk, desktop, table, etc.). Even a few millimeters can make a difference for a user when one considers dimensions of a thumb/finger grasp of a removable medium (e.g., generally between about 0.5 inch (1.25 cm) and about 1.5 inch (3.8 cm) nail-to-nail for an optical disk).

FIG. 2 shows an arrangement that includes the computing device 100 with the media drive 260. As shown, the computing device 100 is located adjacent a side wall of a file cabinet. The media drive 260 is oriented such that a tray 268 extends from a drive body 264 to readily allow for insertion of a removable medium 270. If the computing device 100 were oriented in a flipped orientation with the side 110 downward, the tray 268 would be facing the side wall of the file cabinet, which could make manipulating the removable medium 270 difficult and risk damage to the removable medium 270.

Figure 3:
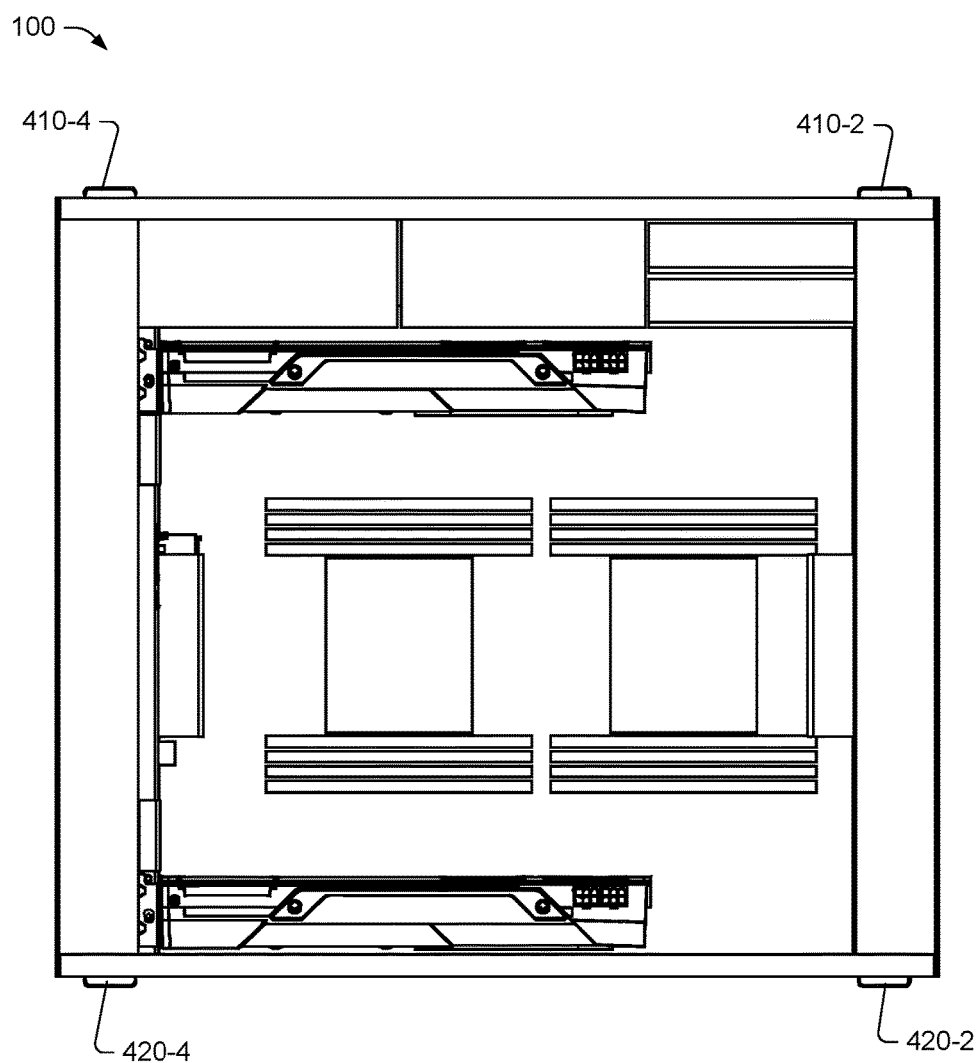
FIG. 3 is a diagram of a view of the computing device of FIG. 1.

FIG. 3 shows a side view of the computing device 100 where feet 410-2, 410-4, 420-2 and 420-4 are visible. As shown, the computing device 100 can include more than one processor and associated memory. For example, the computing device 100 may be a workstation that includes two processor assemblies (e.g., or more) where each assembly may include a dedicated fan or cooling system and associated memory (e.g., RAM, etc.).

Figures 4A, 4B:
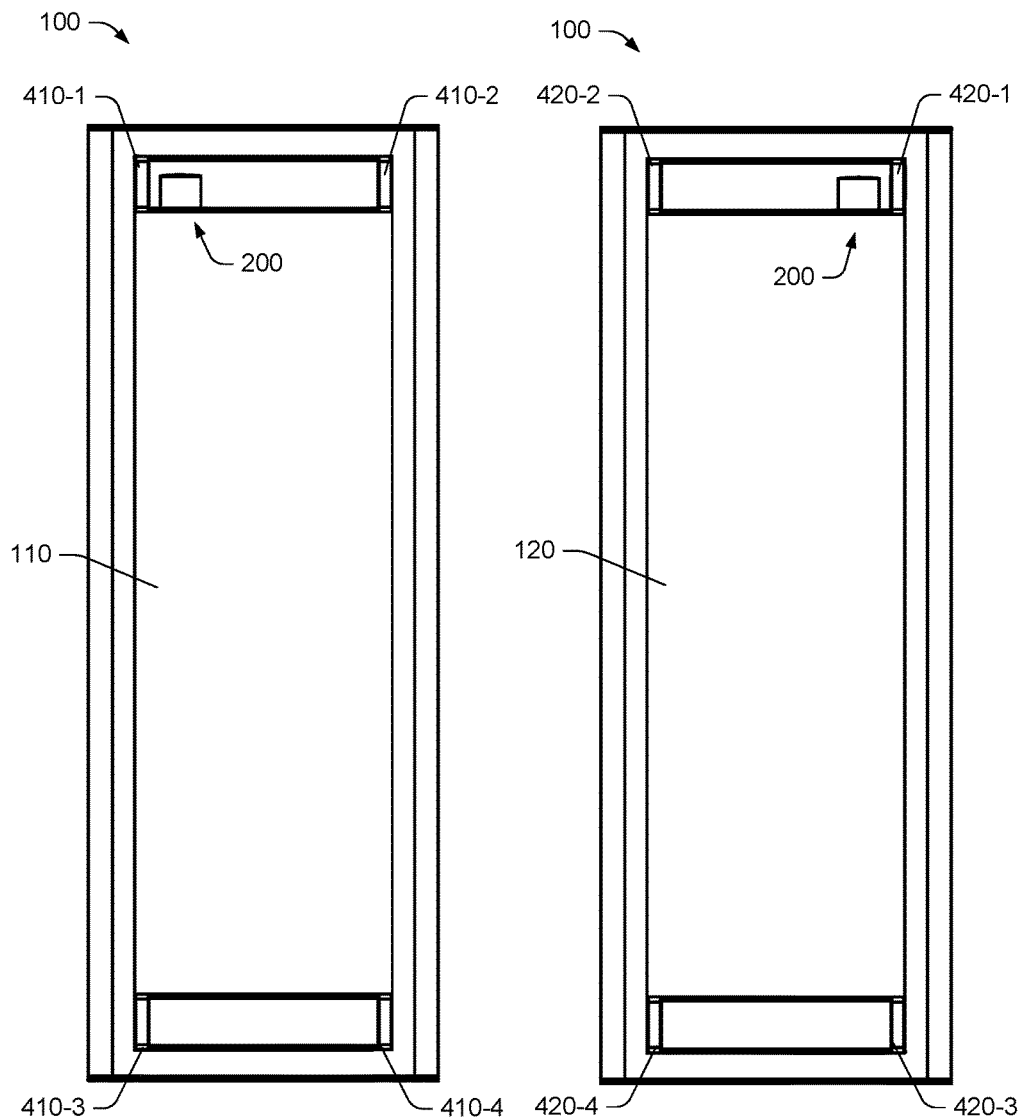
FIG. 4A and FIG. 4B are diagrams of side views of the computing device of FIG. 1.

FIG. 4A and FIG. 4B show side views of the computing device 100 where the sides 110 and 120 can be seen along with one or more electronic components 200 and feet 410-1, 410-2, 410-3 and 410-4 for the side 110 and 420-1, 420-2, 420-3 and 420-4 for the side 120.

Figure 5A:
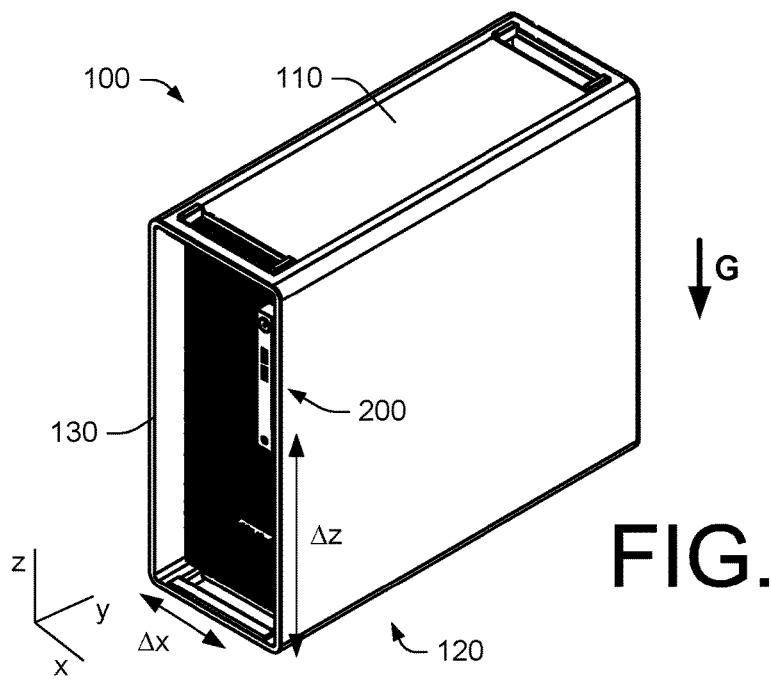
FIG. 5A and FIG. 5B are diagrams of perspective views of the computing device of FIG. 1.
Figure 5B:
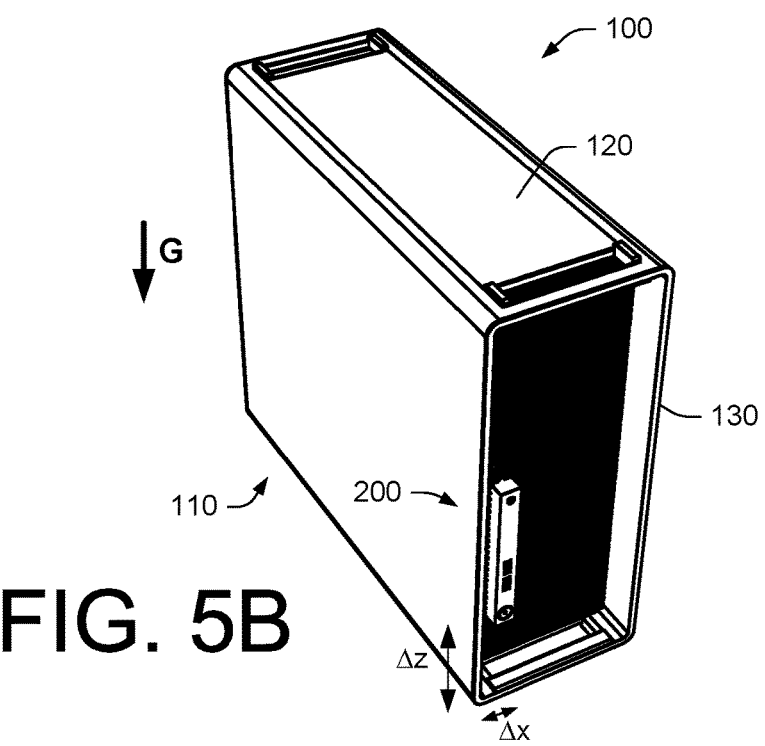

FIG. 5A and FIG. 5B show perspective views of the computing device 100 in two different orientations where various dimensions are shown, as approximately by double headed arrows. As shown, the one or more electrical components are shifted with respect to a lower left hand corner, as a positional reference, of the computing device 100. In FIG. 5A, the side 110 is upward with respect to gravity (G) and in FIG. 5B, the side 110 is downward with respect to gravity (G). As shown in FIG. 5A and FIG. 5B, the computing device 100 can be transitioned from one orientation to another orientation in a manner that causes the position of the at least one electrical component 200 to be changed. For example, in FIG. 5A, the at least one electrical component 200 is changed from being in an upper right position to being, in FIG. 5B, in a lower left position (see, e.g., dimensions $\Delta x$ and $\Delta z$). As shown, the at least one electrical component 200 (see, e.g., the power button 210, the connector 212 and/or the indicator 214 of FIG. 1) is visible and accessible from the front end 130 of the computing device 100, for example, such that a user or servicer can see and/or access one or more of the at least one electrical component 200.

Figure 6A:
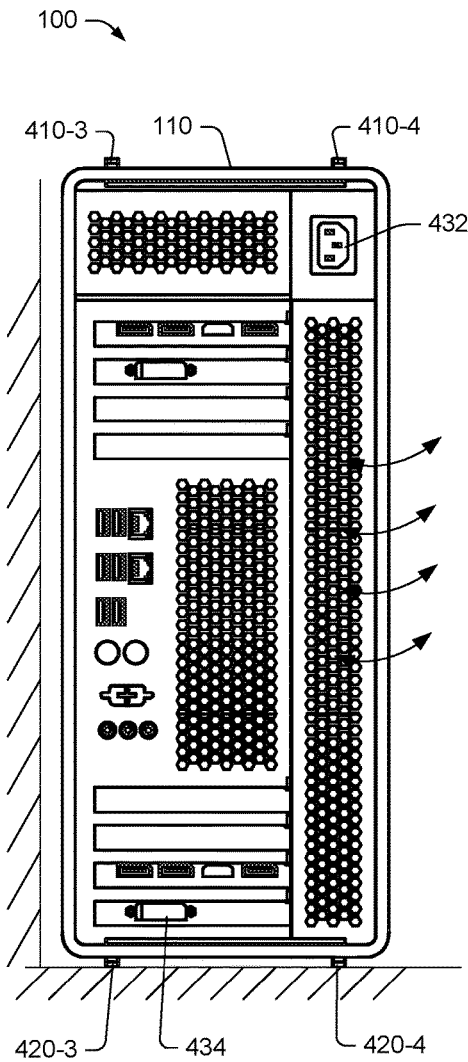
FIG. 6A and FIG. 6B are diagrams of back end views of the computing device of FIG. 1.
Figure 6B:
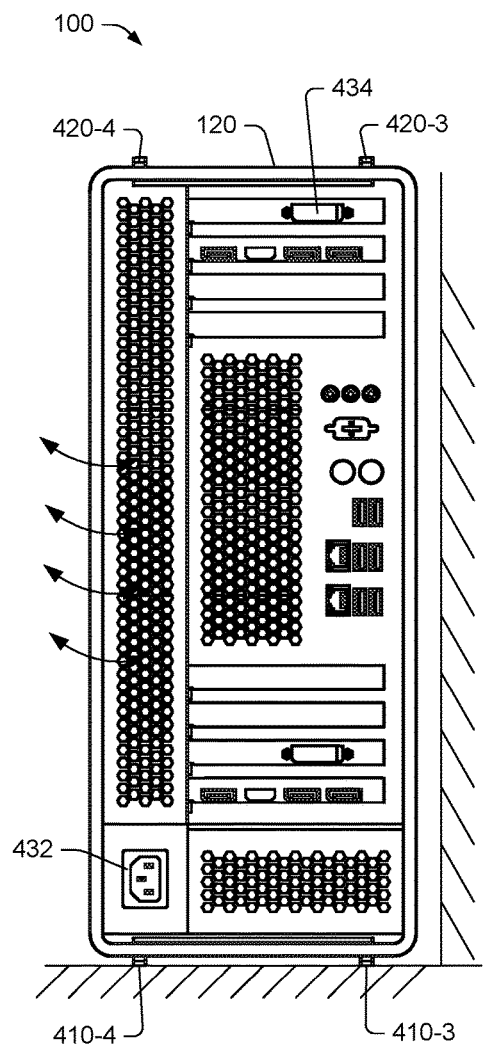

FIG. 6A and FIG. 6B show back end views of the computing device 100 in two different orientations. As shown, a power connector 432 and another connector 434 are in different positions with respect to surfaces, indicated by hatching. Further, double-headed arrows indicate possible directions of airflow (e.g., which can include air flow into and/or out of the drawing page). For example, the computing device 100 may be oriented in one of the two different orientations such that one or more openings that are air flow openings are not toward an obstruction of an environment but rather toward a more open space of the environment.

In the examples of FIGS. 6A and 6B, depending on location of a wall electrical outlet (e.g., a power outlet), the computing device 100 may be oriented in one orientation or the other. As an example, where the connector 434 is a video connector (e.g., consider one or more of the connectors shown in FIG. 6A and FIG. 6B being an HDMI type of connector or other type of video connector, etc.), the computing device 100 may be oriented in one orientation or the other to facilitate connecting a video cable plug end to the connector 434. As an example, a user may determine how to orient the computing device 100 based at least in part on one or more factors, which may include one or more convenience factors and/or one computing device reliability factors (e.g., as to airflow, cooling, etc.); noting that where a connector may be repeatedly utilized (e.g., plug-in, plug-out), an orientation that is selected for convenience may be an orientation that helps to diminish wear of a connector or connectors. For example, if an angle for plugging-in and plugging-out a plug with respect to a connector is not directly straight on due to orientation, wear may be increased for as to the plug and/or the connector, which may lead to decreased life-time of one or more of the plug and the connector.

Figure 7A:
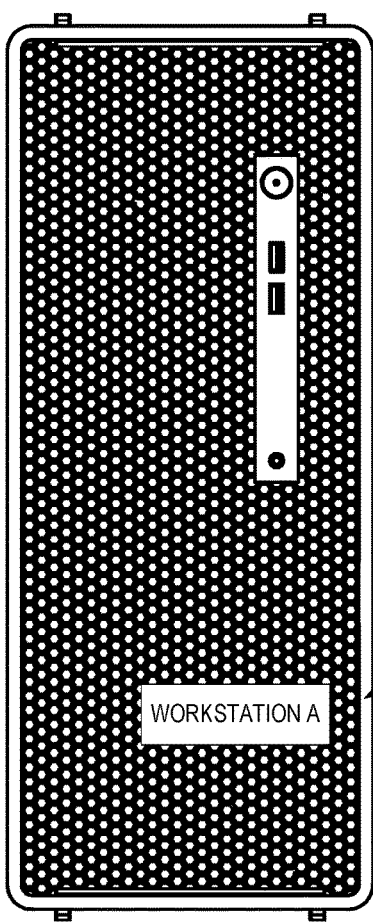
FIG. 7A and FIG. 7B are diagrams of front end views of the computing device of FIG. 1.
Figure 7B:
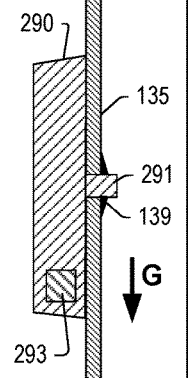

FIG. 7A and FIG. 7B show end views of the computing device 100 in two different orientations along with an inset cross-sectional view as to an example of a rotatable component 290. In the orientations, the rotatable component 290 can be mounted on an axis (e.g., an axle in a bore or journal) such that the rotatable component 290 can be rotated, manually, automatically, under the influence of gravity, etc.

As shown in the inset of FIG. 7B, the rotatable component 290 can include an axle 291 that is received by a receptacle 139 of the surface 135 of the chassis 103 where the receptacle 139 can be or include a journal that receives a portion of the axle 291. As an example, one or more rolling element bearings may be utilized to rotatably support the axle 291, for example, as a rotatable shaft of the rotatable component 290. In the example of the inset of FIG. 7B, the rotatable component 290 may include one or more weights 293 that can, for example, offset the center of mass of the rotatable component 290 such that the rotatable component 290 may be automatically rotated when the computing device 100 is transitioned from the orientation of FIG. 7A to the orientation of FIG. 7B, or vice versa. As shown, a weight can be substantially centered about an axle 291, which may help to avoid the rotatable component 290 from being tilted with respect to a flat surface (e.g., the horizon). As an example, the rotatable component 290 may be square, rectangular, round, oval, or another shape. Such a rotatable component can include a single axis of rotation, for example, via a single axle. As an example, an axle may be lubricated with a liquid or a solid lubricant. As an example, an axle and/or a journal may be made of a material with a low coefficient of friction (e.g., consider a synthetic fluoropolymer of tetrafluoroethylene such as a TEFLON material, etc.).

In the example of FIG. 7A and FIG. 7B, the rotatable component 290 may be a logo that can be visible in a readable manner with letters oriented with respect to gravity in a proper manner (e.g., as the letters are oriented on this page given page numbers at the top right corner). In such an example, a user may avoid having someone ask: "Why is your workstation upside down?" or "Isn't it bad to have your workstation sitting upside down?" The computing device 100 can be manufactured in a manner where it is suitably operable in either of the two different orientations. Such a computing device can signal that capability to a user via a rotatable component such as the rotatable component 290. For example, upon setting up the computing device 100, the rotatable component 290 may rotate automatically about a rotational axis when being handled to allow a user to see that the computing device 100 can be oriented in either of the two different orientations of FIG. 7A and FIG. 7B without having the rotatable component 290 appear "incorrect" as to its orientation. In such an example, the rotatable component 290 can be defined at least in part by a reference frame (e.g., bottom side down for legibility of the wording, logo, etc.).

While the example of FIG. 7A and FIG. 7B show a rotatable component that may not necessarily be electronic, such a component may be electronic. For example, consider a display such as an LED, OLED, etc., type of display that can physically rotate when a device is rotated; noting that if the device is rotated about the rotational axis of the display (e.g., or another rotatable component), the display may remain stationary while the device rotates about it.

Figure 8A:
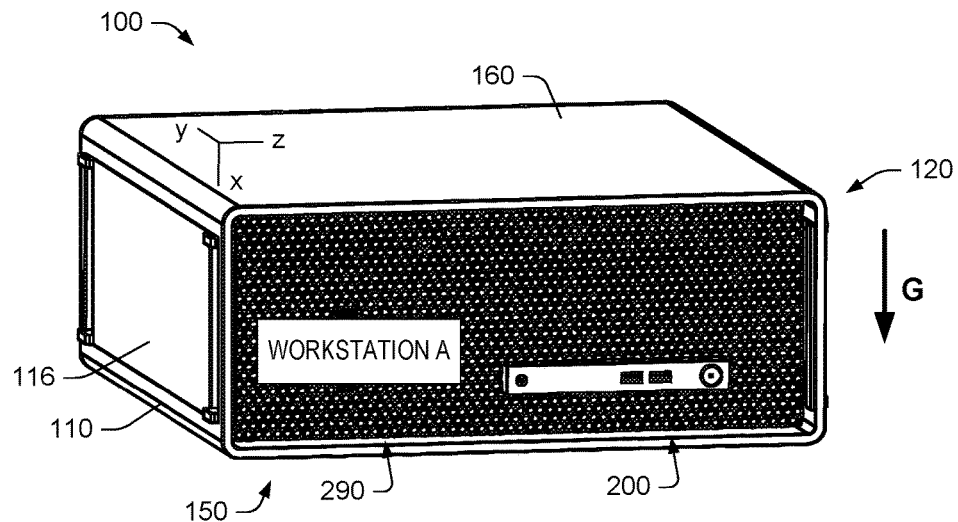
FIG. 8A and FIG. 8B are diagrams of perspective views of the computing device of FIG. 1.
Figure 8B:
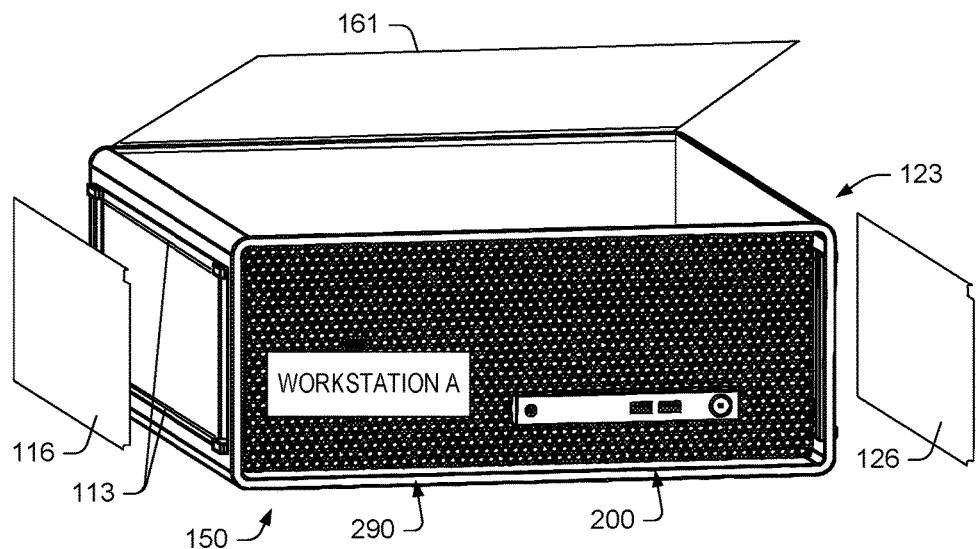

FIG. 8A and FIG. 8B show views of an example of the computing device 100 in a horizontal orientation with respect to gravity (G) such that the x-direction is substantially aligned with gravity and the side 150 is down and the side 160 is up. Such an orientation can be a rack-mountable orientation of the computing device 100. As shown, the rotatable component 290 can be rotated (e.g., automatically, manually, etc.) and the one or more electronic components can be in a position that is closer to the side 150 than the side 160, which can include the cover 161, which is shown as being a hinged cover in FIG. 8B. As an example, the computing device 100 of FIGS. 8A and 8B may optionally be footless except for the sides 110 and 120. Or, for example, one or more of the sides 150 and 160 may include one or more feet. For example, the side 150 may include one or more feet to support the side 150 of the chassis 103 on a substantially planar surface, while the side 160 may be without a foot or feet as it can be a non-recommended side for being oriented downward with respect to gravity (G) due to, for example, heat transfer away from a circuit board.

As shown in FIG. 8B, the computing device 100 can include removable plates 116 and 126 that can be removed to expose mounting features 113 and 123 (not shown). Such mounting features can allow for rack-mounting of the computing device 100 between uprights of a rack. As an example, the computing device 100 can be mounted in a rack in a translatable manner such that the computing device 100 can be translate in the y direction where the openings 117-1 and 127-1 may be utilized for insertion of fingers to grip the computing device 100.

As an example, the mounting features 113 and 123 may be connections for attaching one or more other mounting features, which may be particular features associated with a rack. For example, the mounting features 113 and 123 may include openings, etc., for attachment of a rail or rails via bolts, hooks, screws, etc.

Figure 9A:
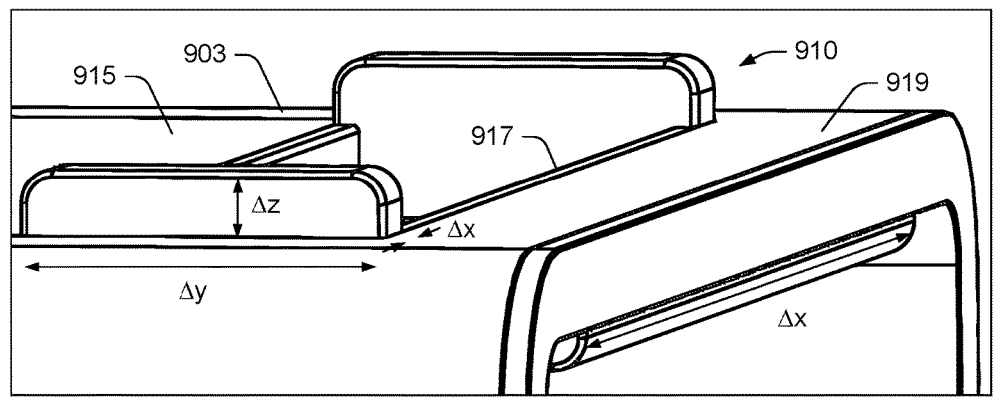
FIG. 9A and FIG. 9B are diagrams of an example of a foot assembly that includes an example of a grip portion.
Figure 9B:
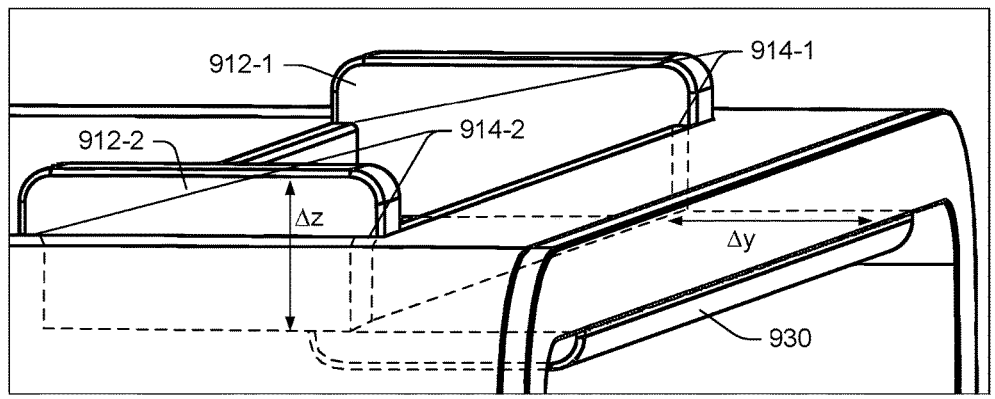

FIG. 9A and FIG. 9B show a view of an example of a feet assembly 910 that includes feet 912-1 and 912-2 and a grip portion 930 with respect to a chassis 903 where the chassis 903 includes a side portion 915, an opening 917 and a side portion 919 where the opening 917 is disposed between the side portions 915 and 919. Various dimensions are shown in FIG. 9A and FIG. 9B that may be utilized to describe and/or define one or more features and/or portions of the feet assembly 910 and/or the chassis 903. As an example, a foot or feet or an assembly that includes at least one foot may be colored. For example, the feet assembly 910 may be red and the portions 915 and 919 may be black. In such an example, the feet assembly 910 may be readily differentiated from the portions 915 and 919, which may facilitate proper positioning of a hand, particularly in a low light situation (e.g., as under a desk, etc.). While red and black are mentioned as colors, one or more other colors may be utilized.

The feet assembly 910 can be a unitary piece that is deformable to be inserted into the opening 917 and to secure itself therein. For example, the feet 912-1 and 912-2 can include notches 914-1 and 914-2 that seat on an outward side of the chassis 903 where the grip portion 930 seats on an inward side of the chassis 903.

As an example, the feet assembly 910 can be in a tension state where a distance between the grip portion 930 and the notches 914-1 and 914-2 of the feet 912-1 and 912-2 is stretched compared to a free standing state of the feet assembly 910.

As an example, the feet 912-1 and 912-2 may be amenable to twisting during installation where the notches 914-1 and 914-2 help to prevent twisting in an installed state. For example, the notches 914-1 and 914-2 can apply a biasing force against the chassis 903 such that aft and fore ends of the feet 912-1 and 912-2 are secured against the chassis 903 in a manner that helps to prevent twisting of each of the feet 912-1 and 912-2.

As shown in FIGS. 9A and 9B, the feet assembly 910 can help to cover one or more surfaces of the chassis 903, which may include one or more surfaces with relatively sharp edges. In such an example, a user that inserts her hand into the opening 917 is less likely to feel discomfort or to experience a cut. In such an example, the feet 912-1 and 912-2 can extend a distance (e.g., in the z-direction) such that sides of the opening 917, as may be manufactured into a side of the chassis 903 (e.g., consider punching of sheet metal) are not exposed once the feet assembly 910 is in its installed state.

In the example of FIG. 9A and FIG. 9B, a user may insert a hand fingers first from the top such that fingers are in contact with the grip portion 930 or a user may insert a hand fingers first from the bottom such that a portion of a palm of the hand may be in contact with the grip portion 930. In such an example, the feet assembly 910 can be installed with respect to the chassis 903 in a unidirectional manner in a bidirectional hand orientation.

As an example, the feet assembly 910 can include symmetry such that it can be utilized in a plurality of portions of a chassis. For example, consider the chassis 103 of the example computing device 100 of FIG. 1. In such an example, four of the feet assemblies 910 may be utilized where each of the four is identical in its shape and size where, during installation of the four feet assemblies, a machine or a user may orient each of the feet assemblies with respect to the chassis 103 or orient the chassis 103 with respect to a feet assembly installer machine. In such an example, a chassis may be manufactured with a plurality of substantially identically shaped and sized openings that can be fit with a plurality of substantially identically shaped and sized feet assemblies.

As an example, a computing device can include feet assemblies that differ and/or feet assemblies and one or more foot assemblies. Or, for example, a computing device can include a plurality of foot assemblies.

As an example, a foot assembly can be akin to one of the feet 912-1 or 912-2 where an interconnecting grip portion such as the grip portion 930 is not present.

Figure 10A:
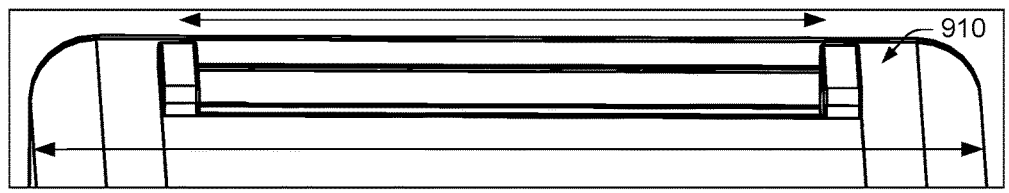
FIG. 10A, FIG. 10B and FIG. 10C are diagrams of the example of the foot assembly of FIG. 9A and FIG. 9B.
Figure 10B:
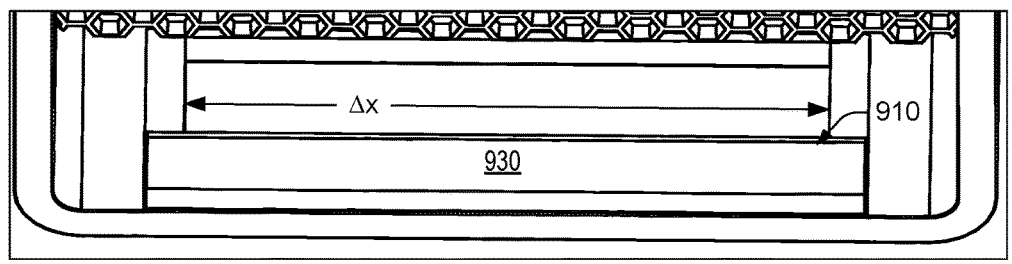
Figure 10C:
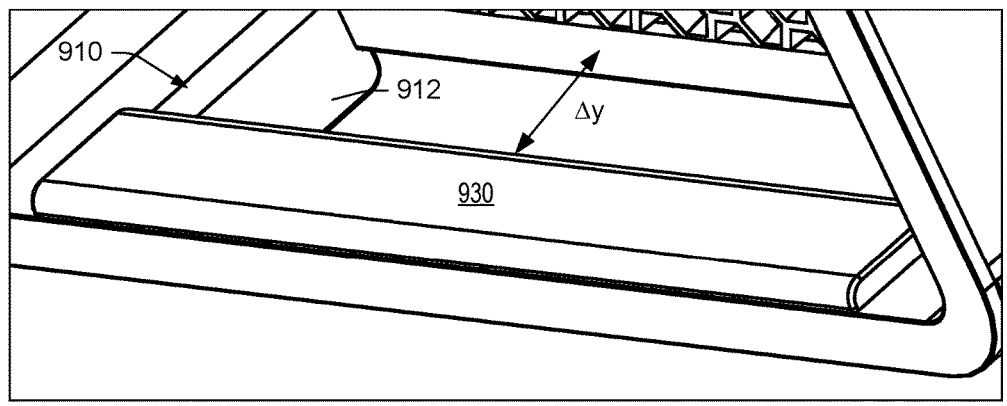

FIG. 10A, FIG. 10B and FIG. 10C show examples of views of the feet assembly 1010 of FIG. 10A, which may be shaped, sized, constructed, etc., as the example feet assembly 1010 shown in FIG. 10B. Various dimensions are shown, which may, for example, be defined with respect to a coordinate system (e.g., a Cartesian coordinate system) and may be utilized to describe and/or define one or more features and/or portions of the feet assembly 910 and/or the chassis 903.

Figure 11:
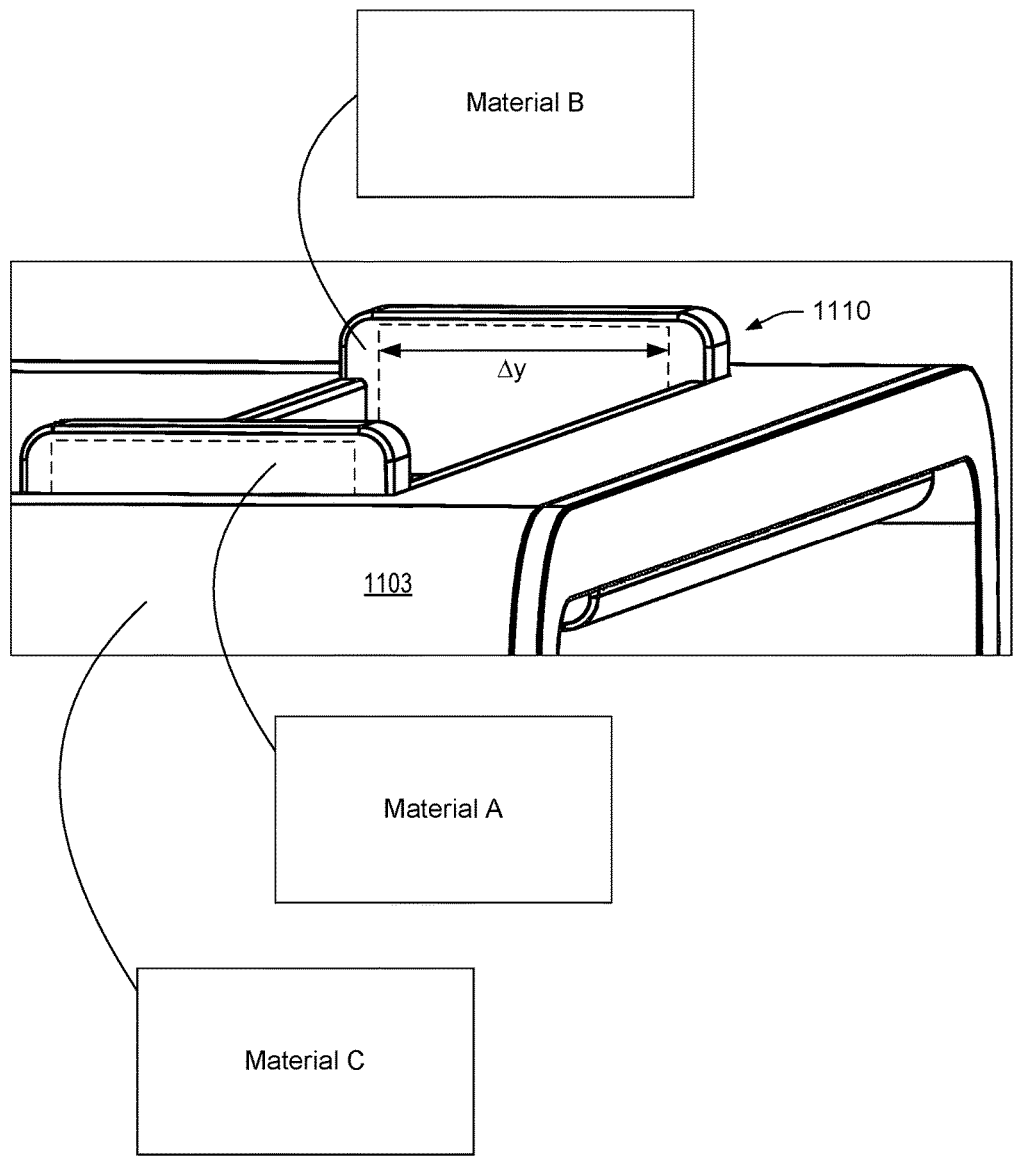
FIG. 11 is a diagram of an example of a foot assembly that can include one or more materials.

FIG. 11 shows an example of a feet assembly 1110 that includes multiple materials. For example, the feet assembly 1110 can include a core portion with material A, which may be at least in part encased in another, different material, material B. As shown, the chassis 1103 may be made of a material such as material C, which may differ from material A and/or material B.

As an example, with respect to rigidity (e.g., Young's modulus) of the materials A, B and C, the materials A and C may be more rigid than the material B. As an example, the size of a core may be sufficient to allow for a layer of a more elastic material thereon such that deformation of the layer without deformation of the core allows for installation of the feet assembly 1110. For example, pushing feet through an opening may occur without deformation of a core or core portions and with deformation of a layer or layers. As an example, a core may be formed in a manner that it is shaped to act as a biasing mechanism. For example, consider a core shaped as a U with ends that can be pushed together from a free standing state and then pushed apart via the core material in an installed state.

As an example, a foot can be a monopod or a multi-ped. For example, the feet 912-1 and 912-2 can be considered to be monopod feet as they each include a substantially contiguous surface that is a contact surface for support of the chassis 903. As an example, a bi-ped foot can include two contact surfaces for support of a chassis. In such an example, consider a U shaped foot where ends of the U define two contact surfaces. In such an example, the foot may be amenable to squeezing the two contact surfaces together, for example, to insert into the opening 917 of the chassis 903 during installation. Once fit into the opening 917, the ends may bias each other apart to thereby secure the foot in the opening 917 of the chassis 903.

As an example, a material can be a polymeric material. As an example, a foot or foot assembly can be polypropylene, optionally co-molded with a more elastomeric material.

As an example, SANTOPRENE material can be overmolded on polypropylene (e.g., injection over polypropylene).

As an example, a material can be a thermoplastic vulcanizate (TPV) such as from a thermoplastic elastomer (TPE) family of polymers. As an example, a TPV can be akin in elastomeric properties to EPDM thermoset rubber, combining the characteristics of vulcanized rubber with the processing properties of thermoplastics.

TPV is a dynamically vulcanized alloy that includes cured EPDM rubber particles encapsulated in a polypropylene (PP) matrix. One or more grades of SANTOPRENE TPV may be utilized.

SANTOPRENE TPV can include relatively small particles (e.g., a couple of microns in diameter or less) of vulcanized rubber (e.g., EPDM rubber) in a thermoplastic phase (e.g., PP). As an example, fully cross-linked or vulcanized can mean approximately 98 percent or above, which can "locked-in" particles and provides stable physical properties.

Figure 12A:
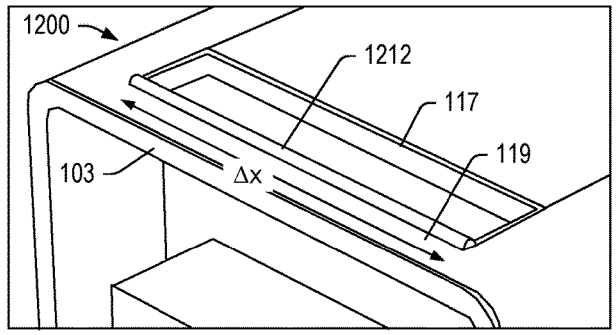
FIG. 12A, FIG. 12B and FIG. 12C are diagrams of an example of a foot assembly.
Figure 12B:
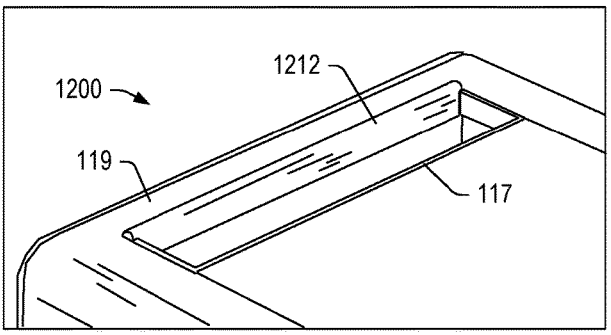
Figure 12C:
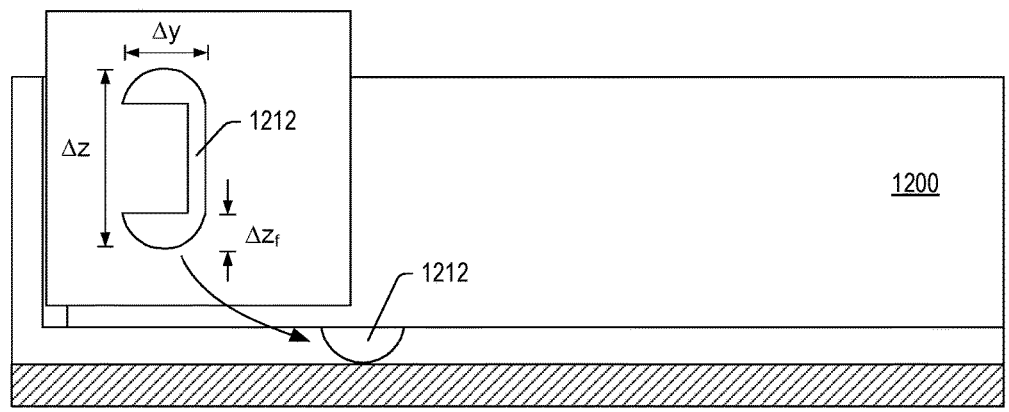

FIG. 12A, FIG. 12B and FIG. 12C show an example of a computing device 1200 that includes a foot 1212 that is disposed in the opening 117 of the computing device 1200 along an edge of the portion 119 of the chassis 103 of the computing device 1200. Various dimensions are shown in FIG. 12A, FIG. 12B and FIG. 12C that may be utilized to describe and/or define one or more features and/or portions of the example foot 1212 and/or the chassis 103.

As shown in FIG. 12A and FIG. 12B, the foot 1212 can span at least a portion of a width of the opening 117. As an example, the foot 1212 can be made of one or more materials. For example, the foot 1212 may be made of an elastomeric material that is comfortable for gripping by a hand where at least one or more fingers of the hand are inserted in the opening 117, from above and/or from below.

As an example, the foot 1212 may be defined by one or more dimensions, for example, as indicated by arrows in FIG. 12C. For example, the foot 1212 may include a height (e.g., z-dimension), a depth (e.g., y-dimension), a length (e.g., x-dimension) as well as one or more foot dimensions (e.g., z-dimensions, see, e.g., $\Delta z_f$), which may optionally be curved such as a semi-circle, a semi-ellipse, a semi-oval, etc. As an example, the foot 1212 can be symmetric about a mid-point, which may provide for ease of assembly as the foot 1212 may be oriented, in such an example, in one of two possible orientations for purposes of fitting in the opening 117.

As an example, the foot 1212 may include a core and a shell where the core may be made of a more rigid material than the shell. As an example, a core may be a material such as polypropylene (PP) and the shell may be an elastomeric material such as a natural and/or a synthetic rubber. As an example, the foot 1212 can include a material such as the SANTOPRENE TPV material.

As an example, the computing device 1200 can include four of the feet 1212, which may be made of the same material or materials or that may optionally differ in material, for example, depending on whether a foot is located near a front end of the computing device 1200 or a back end of the computing device 1200.

Figure 13:
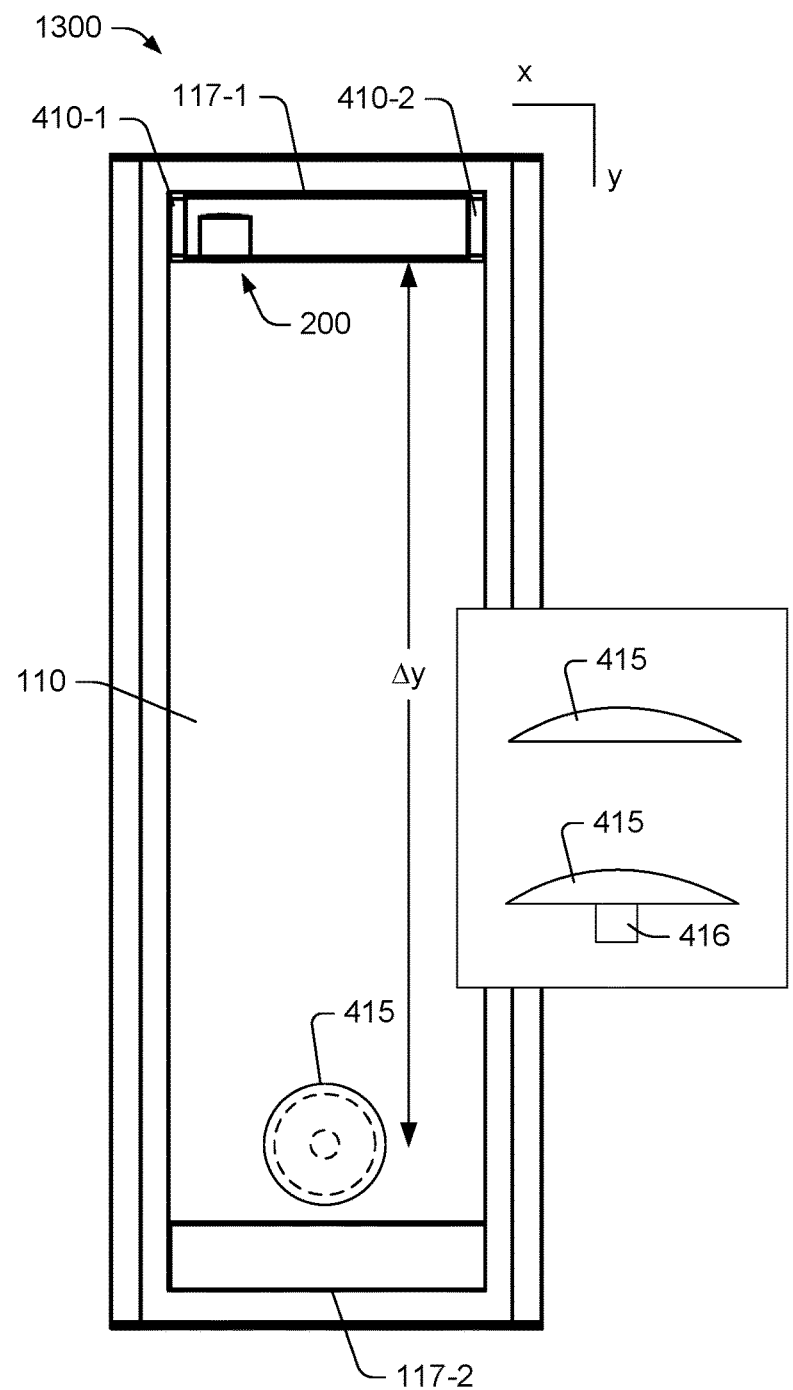
FIG. 13 is a diagram of a side view of an example of a computing device that includes an example of a pad.

FIG. 13 shows an example of a computing device 1300 that can be configured akin to that of FIG. 1; however, one or two sides can include a pad 415 such that, for example, the computing device 1300 can be supported on a surface at three contact surfaces where two correspond to the feet 410-1 and 410-2 and the third corresponds to the pad 415. As an example, the pad 415 may be a low friction pad and located closer to a back end of the computing device 1300 than a front end of the computing device 1300. In such an example, a user may lift the feet 410-1 and 410-2 off a surface (e.g., a table, etc.) and then slide the computing device 1300 where the pad 415 remains in contact with the surface.

FIG. 13 shows, in an inset, two examples of the pad 415 where one includes a substantially planar surface that may, for example, be adhered to the side 110 via an adhesive and where another includes an extension 416 that may be received by a receptacle in the side 110. As an example, an extension may extend from the side 110 and be received in an opening of a pad to attach the pad to the side 110.

As an example, the pad 415 may produce a friction versus time profile such as a lower profile than a friction versus time profile of the feet 410-1 and 410-2. The pad 415 may provide for a lower transition from static-to-kinetic, which may provide for easy and smooth sliding of computer equipment over a surface.

As to a tilt angle, consider a tilt angle of about 12 degrees, which may be defined, at least in part, by the position of the pad 415 with respect to the back edge of the computing device 1300. For example, a person may grab the computing device 1300 using the handle 127-1 on the side 120 to tilt it (e.g., up to an angle of about 12 degrees) and then to apply force to slide it along a surface (e.g., to locate the computing device 1300). In the example of FIG. 13, the computing device 1300 may have a maximum tilt angle $\Theta_{max}$ (e.g., defined at least in part by one or more pads and a back edge).

While the example of FIG. 13 shows a single pad, a device may include more than one pad. For example, consider two pads that are spaced apart at a width that may be approximately the width that the feet 410-1 and 410-2 are spaced apart. As an example, the computing device 1300 can include a pad or pads on the side 120.

As mentioned, the computing device 1200 may include feet such as a plurality of the feet 1212 where, for example, one or more of the feet 1212 is made of a different material or, for example, finished differently than one or more of the other feet 1212. As an example, a back end foot may be made with a low coefficient of friction to facilitate sliding as with the pad 415 of FIG. 13, while a front end foot may be made with a higher coefficient of friction such that when the front end foot is in contact with a surface (e.g., a support surface), the computing device 1200 would not readily slide along that surface. In such an example, a user may tilt the computing device 1200 by lifting up at the front end (e.g., via insertion of a hand in the opening 117, which may include another instance of the foot 1212 as a cushioned foot), and then pull or push the computing device 1200 with the back end foot sliding along the surface, with a relatively low coefficient of friction.

As an example, a computing device can include one or more front end foot or foot assembly (e.g., or feet or feet assemblies) and can include one or more back end foot or foot assemblies (e.g., feet or feet assemblies) where, with respect to a given support surface, the coefficient of friction differs between the front end and the back end where, for example, the back end slides more readily on that given support surface due at least in part to coefficient of friction and/or shape of the one or more foot or foot assemblies (e.g., feet or feet assemblies).

Referring again to the example of FIG. 12C, the foot 1212 can include curved surfaces that are comfortable to grip and that can be, depending on material of construction, provide for tilting and sliding. For example, where a semi-circular profile is utilized, that profile may be comfortable to grip by a hand or one or more fingers of a hand and may be suitable for being tilted at an angle and sliding along a surface (e.g., where the foot may be made of a relatively rigid material with a relatively low coefficient of friction and/or coated with a material with a relatively low coefficient of friction and/or finished with a surface finish that provides for a relatively low coefficient of friction).

While various examples mention polymeric materials as to foot or feet construction, a foot, feet, a foot assembly, a feet assembly, a pad, etc., may be made of one or more types of materials, which can include one or more of organic, inorganic, polymeric, metallic, ceramic, etc.

As an example, a computing device can be defined by a form factor such as a workstation form factor, a rack form factor, a tower form factor, etc. As an example, a computing device may be shaped and/or sized to be suitable for support and use on a desk, on a floor, to the right or the left of a monitor (display), with a sit/stand desk, on a shelf, in a rack, etc.

As an example, a computing device can include feet that can be integrated into rubber handle grips on the top and bottom of a chassis of the computing device.

As an example, a computing device can include a logo that rotates to align with a chosen orientation. In such an example, the logo can be or include a relatively planar portion that can rotate on an axle that is received and/or part of the computing device where the planar portion can rotate with or about the axle.

As an example, a cover may be a door that provides access to an interior space of a chassis where the door may be configurable to open on the right or the left of the chassis. For example, such a computing device can be configured and oriented on a desk, so that the door opens on the most convenient side, which can avoid having to move the computing device (e.g., tower PC, etc.) before the door can be accessed.

As an example, a door may be fully removable. As an example, a door may align with a back edge and pivot between open and closed orientations. As an example, a user or system equipment administrator may choose whether to have the door opening on the right or the left of a chassis of a computing device.

As an example, a computing device can include feet on the top and bottom in combination with one non-centered computing component, which could be one or more of a non-centered power button, a non-centered a port, a non-centered power cable socket, etc. As an example, an indicator may be non-centered with respect to a side of a computing device that includes feet on a top side and feet on a bottom side (noting that the notation as to a top side and a bottom side is referenced with respect to gravity and orientation of the computing device). As an example, a computing component can be an electronic component. As an example, a component, of a computing device, that is non-centered may be rotatable, for example, to maintain a particular orientation with respect to gravity that may be independent of the orientation of the computing device's orientation with respect to gravity.

As an example, a non-centered component can be a logo, which may be a plate or other form that is rotatable, for example, automatically through weighting (e.g., one side may be heavier than another side such that the heavy side orients itself downwardly with respect to gravity) or, for example, manually by a hand or tool.

As an example, a computing device can include a set of recesses that can function as handles where the set includes two on one side and two on another side where, on each side, the recesses are positioned closer to ends (e.g., front and back ends) than a midpoint of the side that is between the front and back ends).

As an example, a computing device can include four handles and four feet or more than four feet where each foot is proximate to a handle.

As an example, locations of feet may be selected to provide stability such that a computing device is not likely to tilt if accidently bumped. For example, feet can be spaced near corners of a side. As an example, feet can be spaced near ends such that risk of banging an end against a surface is reduced, for example, if tilted during lifting or being set down.

As an example, a computing device can include a chassis; a circuit board coupled to the chassis; a processor operatively coupled to the circuit board; and memory accessible by the processor; where the chassis includes a first end, an opposing second end, a first side that includes feet, and an opposing second side that includes feet, and where at least one of the first end and the second end includes an electrical component that is positioned closer to one of the first side and the second side. In such an example, the electrical component can be at least in part accessible from the exterior of the computing device.

As an example, an electrical component can be or include a power button. As an example, an electrical component can be or include a port where, for example, the port may be or include a video port (e.g., optionally including audio and/or other data) and/or optionally including power for a peripheral device electrically connected to the port via a cable, etc.). As an example, an electrical component can be or include a power socket. For example, consider a power socket for a cord that includes a plug at one end that can be plugged into the power socket and a plug at another end that can be plugged into a wall outlet (e.g., for 120V, 220V, 240V, etc. electrical power). As an example, a power socket of a computing device can be operatively coupled to a power supply unit that can, for example, regulate power and, for example, include one or more connectors for electrical equipment that is disposed within a cavity of a chassis of the computing device.

As an example, an electrical component can be or include a drive. For example, a drive may be a drive configured to receive a removable medium such as an optical disk and/or a memory card. In such an example, the drive may include a drive tray where the tray may have two sides where one of the sides receives the removable medium. Such a tray may be translatable in that it can be translated outwardly for removal and/or insertion of a medium and can be translated inwardly for use of the medium.

As an example, a computing device can include first side that includes a handle and a second side that includes a handle. In such an example, the handle of the first side can include at least one of a plurality of feet of the first side and/or, for example, the handle of the second side can include at least one of a plurality of feet of the second side. As an example, a first side can include an opening where a handle of the first side is formed at least in part by the opening and/or, for example, a second side can include an opening where a handle of the second side is formed at least in part by the opening.

As an example, a computing device can include a surface that is recessed from a first end and that is recessed from front edges of the first side and the second side. In such an example, the first side can include an opening that is disposed between the surface and the front edge of the first side. As an example, the surface that is recessed from the first end can include one or more electrical components that are accessible and visible from the first end such that a user may view and/or touch at least a portion of the one or more electrical components (e.g., with a finger, a connector to insert the connector into a connector, to view with an eye or eyes to see a status of an indicator, to insert and/or remove a medium, etc.).

As an example, an opening in a first side or in a second side of a computing device can form at least a portion of a handle. As an example, a first side may include two or more openings where, for example, one finger can be inserted into one opening and another finger can be inserted into another opening. In such an example, the opening or openings can receive an insert, which may be a foot or feet assembly that optionally includes a grip portion. For example, consider the examples of FIG. 9A, FIG. 9B, FIG. 10A, FIG. 10B and FIG. 10C where a bridge may exist (see, e.g., along the arrow of FIG. 10C) that is a divider between two openings. In such an example, the grip portion 930 may be contiguous as shown in FIG. 10C or may be divided. For example, where a bridge exists, a left foot assembly and a right foot assembly may be utilized where the left foot assembly can include a grip portion and where the right foot assembly can include a grip portion. As to two pieces, consider the feet assembly 910 being split into two pieces, a left piece with one foot and a grip portion and a right piece with one foot and a grip portion. As an example, the foot 1212 of FIG. 12A, FIG. 12B and FIG. 12C may optionally be included as separate pieces. For example, the foot 1212 may be a multi-piece foot and optionally the opening 117 may optionally be divided into a plurality of openings by one or more bridges. As an example, the opening 117 can include a left foot and a right foot or, for example, a side can include a plurality of openings where one or more of the openings can receive a foot such as a foot that includes a cross-section shown in the example of the foot 1212 of FIG. 12C.

As mentioned, a computing device can include at least one of a plurality of feet that is adjacent to an opening. As an example, a foot may be positioned a distance from an opening. For example, the example of FIG. 2 shows feet 410-1 and 410-2 that are positioned a distance from the opening 117-1 and feet 410-3 and 410-4 that are positioned a distance from the opening 117-2. As shown in the example of FIG. 2, the opening 117-1 is in a front half of the side 110 along with the feet 410-1 and 410-2 and the opening 117-2 is in a back half of the side 110 along with the feet 410-3 and 410-4.

As an example, a computing device can include a first side that includes an opening and an insert received at least in part by the opening where the insert includes at least one of a plurality of feet of the first side. For example, the example feet assembly 910 of FIG. 9A and FIG. 9B can be an insert that includes two feet; whereas, the example foot 1212 of FIG. 12A, FIG. 12B and FIG. 12C can be an insert that includes a single foot; noting that notches may be made in the foot 1212 to create a plurality of feet.

As an example, an insert that includes at least one foot and optionally a grip portion can include or be made of a polymeric material. As an example, an insert that includes at least one foot and optionally a grip portion may be made of at least two different materials. In such an example, one of the materials can be of a higher stiffness (e.g., a higher Young's modulus, etc.) and form the at least one foot. As an example, a PP material (e.g., or metal, alloy, ceramic, etc.) may be utilized as a stiff material and an elastomeric synthetic and/or natural rubber may be utilized as a less stiff material. As an example, a material such as SANTOPRENE material may be utilized, which includes at least two different materials (e.g., as a composite material). As an example, a material that is of a lower stiffness may form at least a portion of a handle grip (e.g., a grip or grip portion).

As an example, a chassis of a computing device can include a hinged door that includes a hinged end that is positioned closer to one of the first end and the second end.

As an example, a computing device that includes opposing first and second sides can include orientations defined with respect to a direction of gravity where the orientations include a first side up orientation where the computing device is supportable by the feet of a second side and a second side up orientation where the computing device is supportable by the feet of the first side. In such an example, an electrical component that is positioned closer to one of the first side and the second side can include, in the orientations of the computing device, an upper half orientation and a lower half orientation.

As an example, at least one of a first end and a second end of a computing device can include a rotatable component that includes a first orientation and a different, second orientation (see, e.g., the examples of FIG. 7A and FIG. 7B). In such an example, the first orientation and the second orientation can correspond to, respectively, a first orientation of the computing device supported by feet of the second side and a second orientation of the computing device supported by feet of the first side.

As an example, a computing device can include a chassis that includes a first end, an opposing second end, a first side that includes a handle and feet, and an opposing second side that includes a handle and feet, where at least one of the first end and the second end includes a manipulable component. In such an example, the manipulable component can be an asymmetric rotatable component. For example, the asymmetric rotatable component can be a substantially two-dimensional planar component rotatable in a plane where one of the dimensions exceeds the other of the dimensions.

As an example, a computing device can include a chassis that includes a first end, an opposing second end, a first side that includes a handle and feet, and an opposing second side that includes a handle and feet, where at least one of the first end and the second end includes a rotatable component that includes a correct orientation and an incorrect orientation where the rotatable component is rotatable to the correct orientation where the feet of the first side are oriented downwardly with respect to gravity and where the feet of the second side are oriented downwardly with respect to gravity. For example, in the examples of FIGS. 7A and 7B, the rotatable component 290 includes a word "WORKSTATION A" (e.g., a logo, an identifier, etc.), which has a correct orientation as in the words of this page and an incorrect orientation (e.g., an upside down orientation). As explained with respect to the examples of FIGS. 7A and 7B, the rotatable component 290 may be rotatable by hand and/or automatically, for example, under the influence of gravity. As mentioned, a rotatable component may optionally be weighted such that rotation occurs automatically when a computing device is rotated (e.g., from one orientation to another orientation).

As an example, a computing device can include a first side that includes two handles and a second side that includes two handles as well as a first end and a second end (e.g., a back end and a front end). In such an example, one of the first side handles can be positioned proximate to the first end and the other of the first side handles can be positioned proximate to the second end and one of the second side handles can be positioned proximate to the first end and the other of the second side handles can be positioned proximate to the second end.

As an example, a computing device can include opposing panels that are disposed between a first end and a second end and between a first side and a second side. In such an example, at least one of the panels may include a hinge. For example, consider a hinged panel that allows the panel to swing away from a cavity of a chassis to provide access to one or more components that are disposed at least in part in the cavity.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Circuitry includes at least one physical component and can include instructions to perform one or more functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium. As an example, a computer-readable medium may be a computer-readable medium that is non-transitory, not a carrier wave and not a signal.

Figure 14:
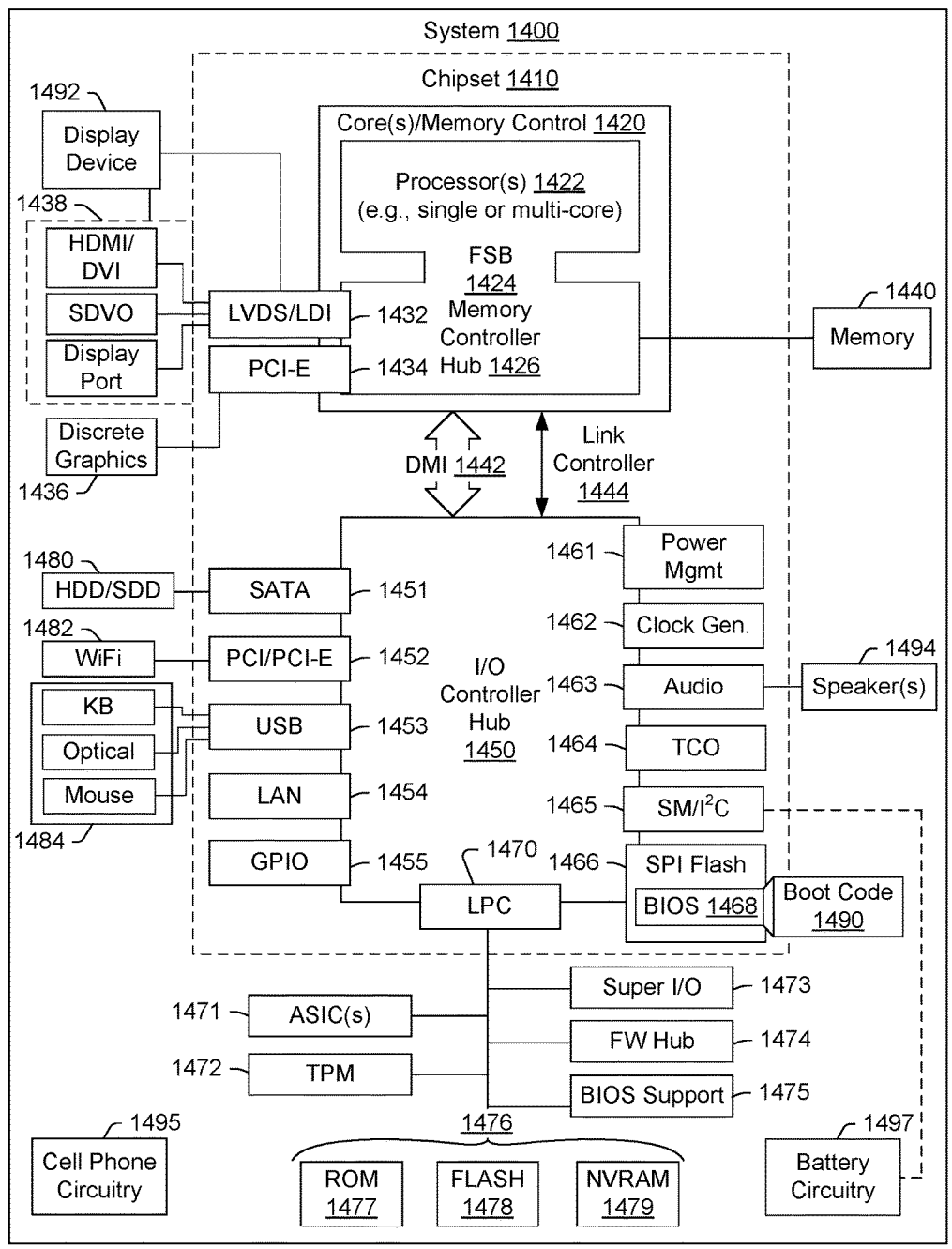
FIG. 14 is a diagram of an example of circuitry of a system, a device, etc.

While various examples of circuits or circuitry may be shown or discussed, FIG. 14 depicts a block diagram of an illustrative computer system 1400. The system 1400 may be a computer system, such as one of the ThinkCentre® or ThinkPad® series of personal computers sold by Lenovo (US) Inc. of Morrisville, N.C., or a workstation computer, such as the ThinkStation® workstation computer sold by Lenovo (US) Inc. of Morrisville, N.C.; however, as apparent from the description herein, a satellite, a base, a server or other machine may include other features or only some of the features of the system 1400 (e.g., consider the ThinkServer® server sold by Lenovo (US) Inc. of Morrisville, N.C.).

As shown in FIG. 14, the system 1400 includes a so-called chipset 1410. A chipset refers to a group of integrated circuits, or chips, that are designed to work together. Chipsets are usually marketed as a single product (e.g., consider chipsets marketed under the brands INTEL®, AMD®, etc.).

In the example of FIG. 14, the chipset 1410 has a particular architecture, which may vary to some extent depending on brand or manufacturer. The architecture of the chipset 1410 includes a core and memory control group 1420 and an I/O controller hub 1450 that exchange information (e.g., data, signals, commands, etc.) via, for example, a direct management interface or direct media interface (DMI) 1442 or a link controller 1444. In the example of FIG. 14, the DMI 1442 is a chip-to-chip interface (sometimes referred to as being a link between a "northbridge" and a "southbridge").

The core and memory control group 1420 include one or more processors 1422 (e.g., single core or multi-core) and a memory controller hub 1426 that exchange information via a front side bus (FSB) 1424. As described herein, various components of the core and memory control group 1420 may be integrated onto a single processor die, for example, to make a chip that supplants the conventional "northbridge" style architecture.

The memory controller hub 1426 interfaces with memory 1440. For example, the memory controller hub 1426 may provide support for DDR SDRAM memory (e.g., DDR, DDR2, DDR3, etc.). In general, the memory 1440 is a type of random-access memory (RAM). It is often referred to as "system memory".

The memory controller hub 1426 further includes a low-voltage differential signaling interface (LVDS) 1432. The LVDS 1432 may be a so-called LVDS Display Interface (LDI) for support of a display device 1492 (e.g., a CRT, a flat panel, a projector, etc.). A block 1438 includes some examples of technologies that may be supported via the LVDS interface 1432 (e.g., serial digital video, HDMI/DVI, display port). The memory controller hub 1426 also includes one or more PCI-express interfaces (PCI-E) 1434, for example, for support of discrete graphics 1436. Discrete graphics using a PCI-E interface has become an alternative approach to an accelerated graphics port (AGP). For example, the memory controller hub 1426 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1450 includes a variety of interfaces. The example of FIG. 14 includes a SATA interface 1451, one or more PCI-E interfaces 1452 (optionally one or more legacy PCI interfaces), one or more USB interfaces 1453, a LAN interface 1454 (more generally a network interface), a general purpose I/O interface (GPIO) 1455, a low-pin count (LPC) interface 1470, a power management interface 1461, a clock generator interface 1462, an audio interface 1463 (e.g., for speakers 1494), a total cost of operation (TCO) interface 1464, a system management bus interface (e.g., a multi-master serial computer bus interface) 1465, and a serial peripheral flash memory/controller interface (SPI Flash) 1466, which, in the example of FIG. 14, includes BIOS 1468 and boot code 1490. With respect to network connections, the I/O hub controller 1450 may include integrated gigabit Ethernet controller lines multiplexed with a PCI-E interface port. Other network features may operate independent of a PCI-E interface.

The interfaces of the I/O hub controller 1450 provide for communication with various devices, networks, etc. For example, the SATA interface 1451 provides for reading, writing or reading and writing information on one or more drives 1480 such as HDDs, SDDs or a combination thereof. The I/O hub controller 1450 may also include an advanced host controller interface (AHCI) to support one or more drives 1480. The PCI-E interface 1452 allows for wireless connections 1482 to devices, networks, etc. The USB interface 1453 provides for input devices 1484 such as keyboards (KB), one or more optical sensors, mice and various other devices (e.g., microphones, cameras, phones, storage, media players, etc.). On or more other types of sensors may optionally rely on the USB interface 1453 or another interface (e.g., I$^2$C, etc.).

In the example of FIG. 14, the LPC interface 1470 provides for use of one or more ASICs 1471, a trusted platform module (TPM) 1472, a super I/O 1473, a firmware hub 1474, BIOS support 1475 as well as various types of memory 1476 such as ROM 1477, Flash 1478, and non-volatile RAM (NVRAM) 1479. With respect to the TPM 1472, this module may be in the form of a chip that can be used to authenticate software and hardware devices. For example, a TPM may be capable of performing platform authentication and may be used to verify that a system seeking access is the expected system.

The system 1400, upon power on, may be configured to execute boot code 1490 for the BIOS 1468, as stored within the SPI Flash 1466, and thereafter processes data under the control of one or more operating systems and application software (e.g., stored in system memory 1440). An operating system may be stored in any of a variety of locations and accessed, for example, according to instructions of the BIOS 1468. Again, as described herein, a satellite, a base, a server or other machine may include fewer or more features than shown in the system 1400 of FIG. 14. Further, the system 1400 of FIG. 14 is shown as optionally including cell phone circuitry 1495, which may include GSM, CDMA, etc., types of circuitry configured for coordinated operation with one or more of the other features of the system 1400.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A computing device comprising:
   a chassis;
   a circuit board coupled to the chassis;
   a processor operatively coupled to the circuit board; and
   memory accessible by the processor;
   wherein the chassis comprises
      a first end,
      an opposing second end,
      a first side that comprises feet, and
      an opposing second side that comprises feet,
   wherein at least one of the first end and the second end comprises an electrical component that is positioned closer to one of the first side and the second side,
   wherein the first side comprises a handle and wherein the second side comprises a handle,
   wherein one of the sides comprises an opening, and
   wherein a corresponding one of the handles is formed at least in part by the opening.

2. The computing device of claim 1 wherein the electrical component comprises a power button.

3. The computing device of claim 1 wherein the electrical component comprises a port.

4. The computing device of claim 3 wherein the port comprises a video port.

5. The computing device of claim 1 wherein the electrical component comprises a power socket.

6. The computing device of claim 1 wherein the electrical component comprises a drive.

7. The computing device of claim 1 wherein the handle of the first side comprises at least one of the feet of the first side.

8. The computing device of claim 1 wherein the handle of the second side comprises at least one of the feet of the second side.

9. The computing device of claim 1 wherein the first side comprises the opening and wherein the handle of the first side is formed at least in part by the opening.

10. The computing device of claim 1 wherein the second side comprises the opening and wherein the handle of the second side is formed at least in part by the opening.

11. The computing device of claim 1 comprising a surface that is recessed from the first end and from front edges of the first side and the second side.

12. The computing device of claim 11 wherein the first side comprises the opening, wherein the opening is disposed between the surface and the front edge of the first side.

13. The computing device of claim 12 wherein at least one of the feet of the first side is adjacent to the opening.

14. The computing device of claim 1 wherein the first side comprises the opening and an insert received at least in part by the opening wherein the insert comprises at least one of the feet of the first side.

15. The computing device of claim 14 wherein the insert comprises at least two different materials wherein one of the materials comprises a higher stiffness and forms the at least one of the feet of the first side and wherein one of the materials comprises a lower stiffness and forms a handle grip of the handle.

16. The computing device of claim 1 comprising orientations defined with respect to a direction of gravity wherein the orientations comprise a first side up orientation wherein the computing device is supportable by the feet of the second side and a second side up orientation wherein the computing device is supportable by the feet of the first side and wherein the electrical component that is positioned closer to one of the first side and the second side comprises, in the orientations of the computing device, an upper half orientation and a lower half orientation.

17. The computing device of claim 1 wherein at least one of the first end and the second end comprises a rotatable component that comprises a first orientation and a different, second orientation.

18. The computing device of claim 1:
   wherein at least one of the first end and the second end comprises a rotatable component that comprises a correct orientation and an incorrect orientation wherein the rotatable component is rotatable to the correct orientation wherein the feet of the first side are oriented downwardly with respect to gravity and wherein the feet of the second side are oriented downwardly with respect to gravity.

19. A computing device comprising:
a chassis;
a circuit board coupled to the chassis;
a processor operatively coupled to the circuit board; and memory accessible by the processor;
wherein the chassis comprises
   a first end,
   an opposing second end,
   a first side that comprises feet, and
   an opposing second side that comprises feet, and
   a surface that is recessed from the first end and from front edges of the first side and the second side,
wherein the first side comprises an opening that is disposed between the surface and the front edge of the first side, and
wherein at least one of the first end and the second end comprises an electrical component that is positioned closer to one of the first side and the second side.

20. The computing device of claim 19 wherein the opening forms at least a portion of a handle.

21. A computing device comprising:
a chassis;
a circuit board coupled to the chassis;
a processor operatively coupled to the circuit board; and memory accessible by the processor;
wherein the chassis comprises
   a first end,
   an opposing second end,
   a first side that comprises feet, and
   an opposing second side that comprises feet,
wherein the first side comprises an opening and an insert received at least in part by the opening wherein the insert comprises at least one of the feet of the first side, and
wherein at least one of the first end and the second end comprises an electrical component.

22. The computing device of claim 19 wherein at least one of the feet of the first side is adjacent to the opening.

23. The computing device of claim 21 wherein the insert comprises at least two different materials wherein one of the materials comprises a higher stiffness and forms the at least one of the feet of the first side and wherein one of the materials comprises a lower stiffness and forms a handle grip.

* * * * *